United States Patent [19]

Brook

[11] 4,163,488

[45] Aug. 7, 1979

[54] CONVEYOR SYSTEMS

[75] Inventor: Richard M. Brook, Huddersfield, England

[73] Assignee: Auto Systems Limited, Waterloo, England

[21] Appl. No.: 796,095

[22] Filed: May 12, 1977

Related U.S. Application Data

[63] Continuation-in-part of Ser. No. 652,963, Jan. 28, 1976, abandoned.

[30] Foreign Application Priority Data

Jun. 11, 1976 [GB] United Kingdom ............... 24199/76

[51] Int. Cl.² .......................................... G01G 19/14
[52] U.S. Cl. ..................................... 198/504; 177/52; 209/592
[58] Field of Search ............... 198/504, 680, 779, 837; 209/121, 592–595; 177/52, 53, 119, 145, 163; 308/6 C; 193/2 D

[56] References Cited

U.S. PATENT DOCUMENTS

| | | | |
|---|---|---|---|
| 1,902,512 | 3/1933 | Mehl | 198/504 |
| 2,938,626 | 5/1960 | Dahms | 198/504 |
| 3,111,350 | 11/1963 | Anderson | 308/60 |
| 3,180,475 | 4/1965 | Rosso | 177/52 |
| 3,642,130 | 2/1972 | Altenpohl | 209/121 |
| 3,651,939 | 3/1972 | Harben et al. | 209/121 |

*Primary Examiner*—Joseph E. Valenza
*Attorney, Agent, or Firm*—John C. Smith, Jr.

[57] ABSTRACT

A conveyor system includes a plurality of article carriers supported for movement in succession on a rail along a first predetermined path. The support plate of an electronic weigh cell is positioned along a second predetermined path adjacent the first path and at least one endless flexible member is arranged for movement along the second path towards the support plate. The article carriers are moved in succession along the first path so that each article carrier in turn passes adjacent the endless flexible member. Each article carrier is adapted to engage the endless flexible member as the article carrier moves along the first path such that at least a part of the article carrier and any article carried thereby is moved along a portion of the second path onto the support plate so that a load is applied thereto. The electronic weigh cell is arranged to emit a signal which is related to the total weight of the portion of the article carrier and any article carried thereby.

5 Claims, 6 Drawing Figures

-FIG.2-

CONVEYOR SYSTEMS

BACKGROUND TO THE INVENTION

This is a continuation-in-part of my copending application Ser. No. 652,963 filed Jan. 28, 1976, now abandoned.

DESCRIPTION OF THE PRIOR ART

Conveyor systems are known, for example from U.S. Pat. No. 3,642,130, which comprise a plurality of article carriers (e.g. shackles for carrying poultry carcasses) movable along a predetermined path, a device for measuring the weight of each article carrier (including the weight of any article carried thereby) being positioned at a point in the path. It is desirable to cause each article carrier to ride up on to the measuring device, so that the article carrier is wholly supported by the measuring device during weighing. Poultry processing conveyors such as that shown in U.S. Pat. No. 3,642,130 convey the article carriers using wheeled trolleys which run along a rail, so such conveyors have logically caused the article carriers to ride up on to the measuring device by providing each article carrier with wheels which engage sloping portions of rail leading up to the weighing device.

In a quite different conveying art, that of belt conveyors, it is known to convey articles without the use of special article carriers such as poultry shackles, for example by placing the articles directly on to a continuous belt conveyor. U.S. Pat. No. 2,938,626 shows such a conveyor and a weighing machine for use therewith. Here again arrangements are made to lift articles up on to a weighing device and since the articles are being conveyed on an endless belt conveyor, the obvious way to raise them is to provide a further set of belts which run up on to the weighing device.

Hitherto there has never been any suggestion that there could be advantages in combining part of one type of conveying system with part of an entirely different type of conveying system, and there is no teaching in either of the above mentioned patents which suggests this. Indeed such a combination would have been regarded as illogical. The type of conveyor which is selected to do a particular job, for example an overhead rail conveyor or a continuous belt conveyor, is dictated by the type of article to be conveyed and the type of process to which the article is to be subjected. If for example one selected a continuous belt conveyor because it suited a particular system, to then proceed and use part of a rail and trolley conveyor with the belt conveyor system or vice-versa would have seemed almost as nonsensical as combining a gasoline powered engine with a steam driven apparatus. However I have now discovered that the use of one or more belts or other endless flexible members can be used to overcome a serious disadvantage of the rail and trolley conveyor system of the type shown in U.S. Pat. No. 3,642,130. The accuracy of weighing of such systems has always been severely limited, and it has been assumed that such inaccuracies were due to limitations in the scale beam weighing techniques employed, including transient effects caused by oscillations of the scale beams when a weight is first applied thereto.

However I have developed a system of weighing articles as they are moved along a conveyor, utilising an electronic weigh cell which emits a signal related to the load applied to the cell, the signal varying continuously with the load applied. A clear distinction can be drawn between the use of my electronic weigh cell and simple on-off valves such as that shown in U.S. Pat. No. 3,642,130 or simple on-off switches such as that shown in U.S. Pat. No. 3,651,939. Such valves or switches are switched on by the action of some form of mechanical balance and considerable difficulties can be encountered in presetting the devices, because when a load is first applied, the balances tend to swing through the mean position which they should occupy under correct static load conditions and the valves or switches may be actuated by an article which is lighter than that intended.

My use of an electronic weigh cell has enabled me to cope with much higher speeds of weighing and to eliminate the problems caused by such transients. This is firstly because the transients are much less when a mechanical balance system is avoided and secondly, because the output of the cell can be electrically gated so that a weight signal is only utilised after the article being weighed has ceased the oscillations which occur when an article is first applied to the cell. These oscillations start with a maximum and progressively diminish to zero according to a pattern and time scale which can be predicted and allowed for.

However by increasing the accuracy and sensitivity of my weighing system, I discovered that there was another source of inaccuracy which was irregular and unpredictable and this has been traced to the wheels utilised on the article carriers. Provided that these wheels are mounted in very good bearings and have regular maintenance, so that they run freely, there is no problem, but if the wheels become even slightly stiff and fail to turn completely freely, the wheels can judder and bounce as they move over the weighing device and as each wheel may behave differently and bounce or judder at any time during passage of the wheel over the weighing device, these effects cannot be predicted and allowed for in the electronic weighing system. The juddering may not even be detectable by visual observation but nevertheless can result in severe distortions of the weighing results.

OBJECTS OF THE INVENTION

It is the primary object of the invention to overcome the disadvantages of the prior art conveyor syatems and provide a system having a much higher degree of accuracy in weighing, with the minimum distortion resulting from unpredictable juddering and vibration.

It is a secondary object of the invention to provide a conveying system having a weighing device which is far simpler and more compact than those of prior art devices.

SUMMARY OF THE INVENTION

Once I had traced the source of inaccuracy to the wheels of the prior art article carriers, the logical solution to the problem was to provide improved bearings for the wheels but I soon realised that the conditions in which such article carriers are used, for example in a poultry processing plant, are such that even the best bearings may be affected. The article carriers travel to all parts of a processing plant, and in the case of a poultry processing plant may be subjected to a considerable amount of dirt, water, dust, feathers and there is a considerable likelihood that wheels will jam or at least become stiff. The only solution appeared to be to arrange for regular maintenance of the wheels but a single processing plant can contain several hundred article carriers which are continually in motion around the plant and such regular maintenance is very difficult.

Eventually I realised that the problem could be virtually eliminated by, in effect, taking the moving part off the article carriers and positioning it on the weighing device itself. I realised that this would have two significant benefits. Firstly, there is only one item of apparatus to maintain in good smooth running condition, at one stationary point, and secondly, since the apparatus is positioned at one point, an attempt can be made to keep that point reasonably free of dust, dirt, and the like.

After some thought and experimentation, I decided that the most effective solution was to utilise a small endless flexible member which would carry each article carrier smoothly over the weighing device. The present invention therefore provides, according to one aspect, a conveyor system comprising: a plurality of article carriers; means supporting said article carriers for movement in succession along a first predetermined path; weight sensing means positioned along a second predetermined path adjacent said first path; conveyor means comprising at least one endless flexible member arranged for movement along said second path towards said sensing means; means for moving said article carriers in succession along said first path so that each article carrier in turn passes adjacent said endless flexible member; each article carrier including means adapted to engage said endless flexible member as said article carrier moves along said first path whereby at least a part of said article carrier and any article carrier thereby is moved along a portion of said second path to said weight sensing means so that a load is applied thereto; and said weight sensing means being arranged to emit a signal which is related to the total weight of said portion of said article carrier and any article carried thereby.

When a conveyor system according to the invention is utilised in poultry processing, there is no longer any need to maintain each of the wheels of the large number of article carriers. The system will provide rapid and very accurate weighing even if the wheels are totally jammed.

Since the endless flexible member is provided principally as a bearing surface between the article carriers and the weighing device, to ensure that the article carriers pass smoothly over the weighing device, a very simple and compact weighing device can be provided and further experimentation and investigation has led me to discover that the endless flexible member can be mounted on a weight sensing device so that it is totally supported by the weight sensing device. A minimum number of parts is required, since it is only necessary to attach a support device to the weight sensing device and arrange the endless flexible member so that it runs around the support device. The invention therefore provides according to another aspect, a conveyor system comprising: a plurality of article carriers; means supporting said article carriers for movement along a predetermined path; a weight sensing device positioned along said predetermined path; at least one support device mounted on and supported by the weight sensing device; at least one endless flexible member mounted on and supported by the support device and having an upper run which travels over the upper surface of the support device and a lower return run which travels back along the under surface of the support device; means for moving the article carriers in succession along said predetermined path so that each article carrier in turn passes adjacent said endless flexible member; and each article carrier including means adapted to engage said endless flexible member as said article carrier moves along said path whereby at least a part of said article carrier and any article carried thereby is moved on said flexible member over said support device so that a load is applied to the support device and hence to the weight sensing device.

To ensure smooth movement of an article carrier over the weighing device I have found that it is desirable for the endless flexible member to be driven at the same speed as the article carriers but I have realised that it is unnecessary to complicate the apparatus by providing special driving means, or by coupling the means driving the article carriers to the endless flexible member. It have realised that the necessary results can be achieved by the remarkably simple expedient of ensuring that the endless flexible member has means which receive and co-operate with the article carriers so that the article carriers themselves drive the endless flexible member at the desired speed. Thus according to yet another aspect of the invention, there is provided a conveyor system comprising a plurality of article carriers; means supporting said article carriers for movement along a predetermined path; a weight sensing device positioned along said predetermined path; at least one support device mounted on and supported by said weight sensing device; at least one endless flexible member having an upper run which passes over said support device; means mounting said endless flexible member for free movement with said upper run travelling freely over said support surface; means for moving the article carriers in succession along said predetermined path so that each article carrier in turn passes adjacent said endless flexible member; and each article carrier including means adapted to drivingly engage said endless flexible member as said article carriers are moved along said path so that each article carrier imparts movement to the endless flexible member and is carried on the endless flexible member over the support device, so that a load is applied to the support device and hence to the weight sensing device.

DESCRIPTION OF EMBODIMENTS OF THE INVENTION

Figure 1:
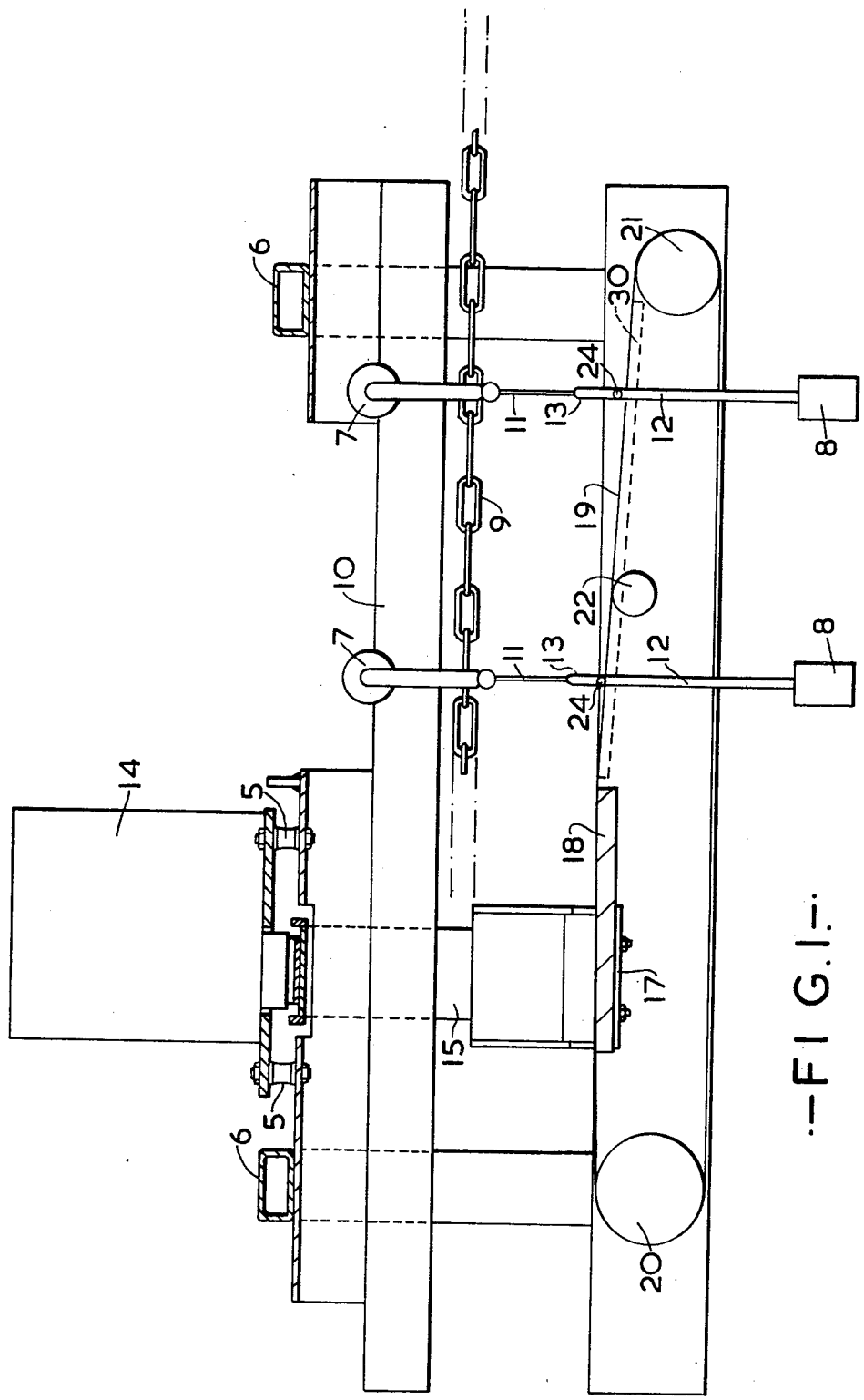
FIG. 1 is a side view of one embodiment of conveyor system and sensing device according to the invention.
Figure 2:
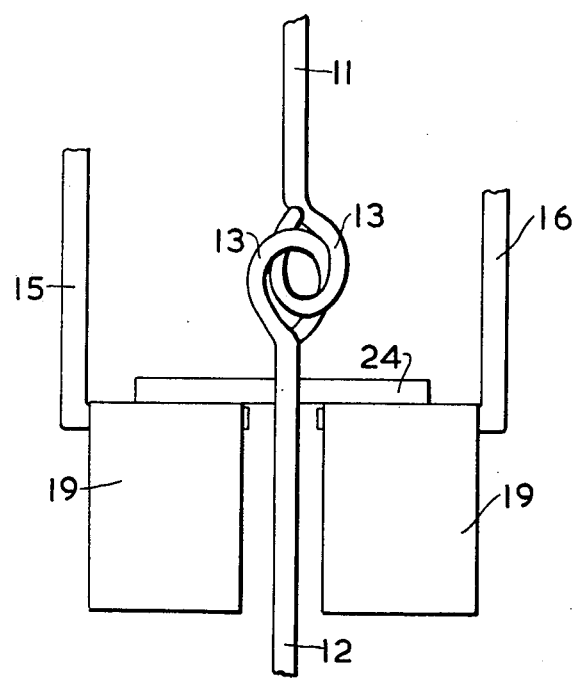
FIG. 2 is an end view of part of the sensing device shown in FIG. 1.

Referring first to FIGS. 1 and 2, there is shown a conveyor system comprising a continuous tubular rail 10 along which a succession of poultry carcass shackles 8 are drawn by an endless chain 9. The shackles are supported by rollers 7 which run on the rail 10, the rollers and shackles being connected together by two rods 11, 12, which are linked together by a pair of eyes 13.

Mounted above the rail 10 on a support frame 6 is a transducer in the form of an electronic weigh cell 14, from which two legs 15 and 16 extend downwardly, one on each side of the rail 10. The weigh cell is secured to the frame 6 by shock-absorbent mountings 5. At the lower end of each leg there is an inwardly protruding foot 17 to which is fastened a support plate 18. An endless belt 19 runs over each support plate 18. Each belt runs between a driven wheel 20 and an idler wheel 21, the wheels being mounted on the support frame 6. Additional support is provided by a smaller idler wheel 22. The dimensions and positions of the support wheels are such that the run of the belt extending between the wheels 21 and 22 provides a ramp portion leading up to the level of the support plate 18. Each shackle rod 12 has a transversely extending pin 24 near to its upper end and as each shackle in turn moves towards the sensing device the rod 24 engages with the ramp portions of the belt, bridging the gap between the two belts, and rides up on to the portion of the belts running over the plates 18. The belts are driven at a speed which corresponds to the speed of the shackles. The belts and the chain moving the shackles may be driven from the same source.

As each rod 24 moves over the plates 18 the weight of the shackle and any carcass carried thereby is applied to the plates 18, and hence to the cell 14, causing the cell 14 to emit a signal which is related to the load applied thereto. This signal may be used to count the number of carcasses passing the sensing device, or to measure the weight of the carcasses, for example for use in sorting the carcasses by weight. The sensing device may be used to replace the sensing devices described in our co-pending application Ser. No. 495,016, now U.S. Pat. No. 3,997,013. The weight of each shackle is no longer supported by the rail 10 as the shackle rises, because the two links 13 are displaced relative to one another as shown in FIG. 2.

It is possible to dispense with continuous driven belts mounted on the support frame 6, and utilise smaller endless chains suspended directly from the weigh cell 14. Referring to FIGS. 3 to 6, there is shown a track 41, for attachment to each of the legs 15. An endless chain 42 runs around the track. Each chain comprises pairs of ball races 43 mounted on pins 43a which are interconnected by chain-links 44. The chain-links 44 are shaped to define recesses 45 between adjacent pairs of ball races.

Figure 5:
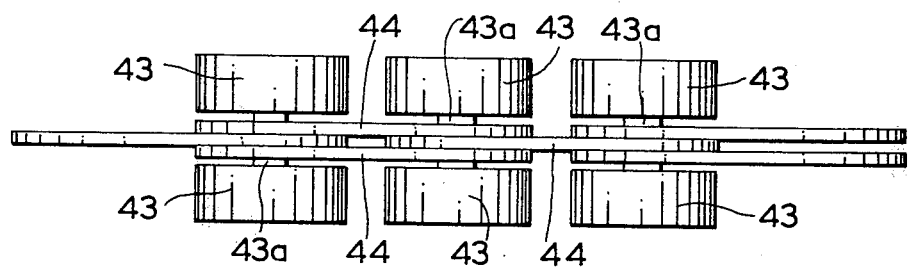
FIG. 5 is a plan view of part of the sensing device shown in FIGS. 3 and 4.
Figure 6:
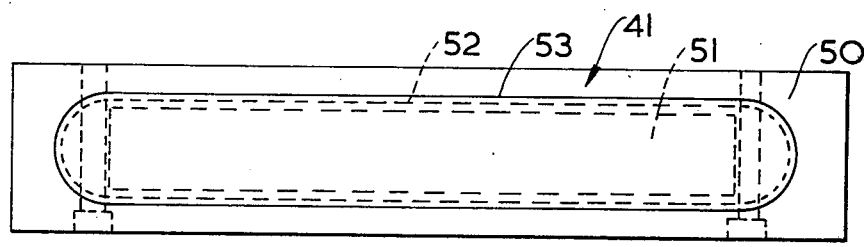
FIG. 6 is a side view of one of the tracks of the sensing device shown in FIGS. 3 and 4.

The construction of each chain is illustrated in detail in FIG. 5 which shows part of one chain. Three pairs of ball races 43 are shown, each pair being interconnected by a pin 43a. Two chain-links 44 connect the left-hand pin 43a to the central pin 43a and a single link sandwiched between the first two links connects the central pin 43a to the right-hand pin 43a. The pairs of links and single links continue alternately along the length of the chain.

The pins 43a engage in the inner core 43b (FIG. 3) of each ball race, the outer ring 43a of each ball race being free to rotate smoothly on the core 43b.

Each track member 41 comprises a main body portion 50 in the shape of a rectangular block, for attachment to one of the legs 15, e.g. by means of a suitably shaped adapter member bolted to the leg 15 and to the portion 50. Projecting from the portion 50 is a portion 51 which has a generally rectangular central portion and two track portions 52, one on each side of the central portion. These portions are rectangular with rounded ends and provide running surfaces for the ball races. Each portion 51 also has a raised portion 53 adjacent each track portion 52 to retain the ball races on the track portions.

The shackles are modified from those shown in FIGS. 1 and 2, in that they comprise a vertical portion 46 connected to the driving chain 9, and hanging from the part 46 is a hinged link comprising an upper part 47 and a lower part 48. Where the parts 47 and 48 are hinged together, a roller 49 is positioned on either side of the link.

Figure 3:
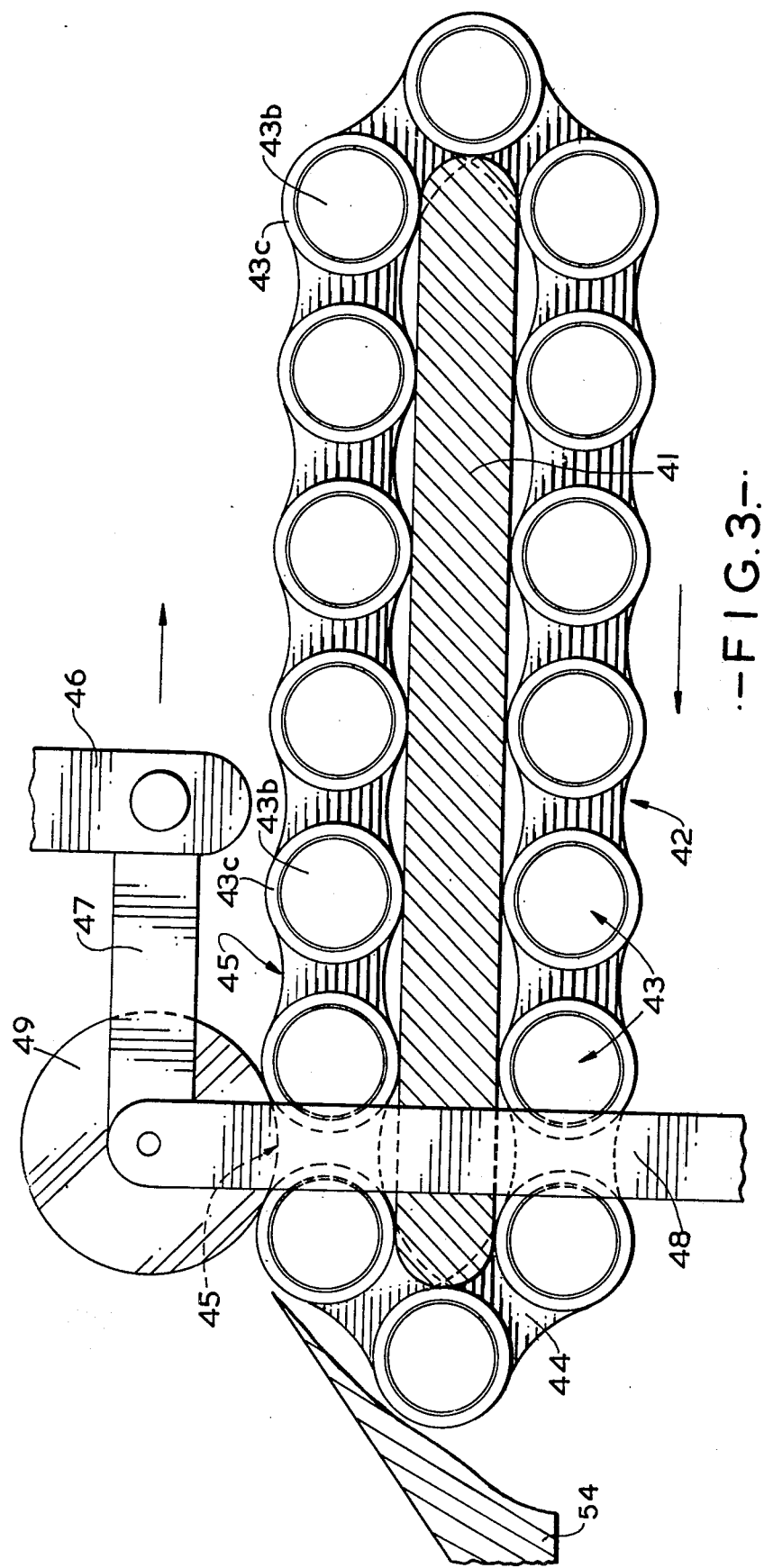
FIG. 3 is a side view showing part of a second embodiment of sensing device according to the invention.
Figure 4:
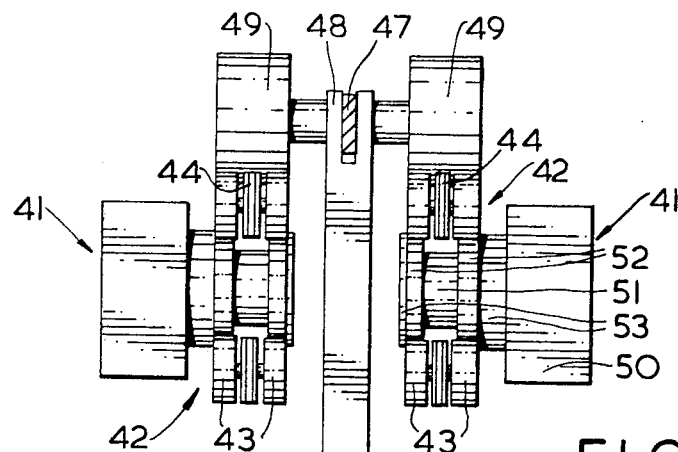
FIG. 4 is an end view of the sensing device shown in FIG. 3.

The direction of movement of the shackles is from left to right as viewed in FIG. 3. Each shackle normally hangs with the portions 46, 47 and 48 forming a continuous straight vertical line, but as each shackle approaches the sensing device ramp members 54 positioned one on each side of the rail 10 engage the two rollers 49 respectively so that the rollers ride up the ramp members, lifting the shackle portion 48 so that its load is no longer supported on the rail 10. When the rollers 49 reach the end of the ramp members, each roller drops into one of the recesses 45 and the shackle then moves between the two tracks 41, drawing the chains 42 along with it. Owing to the action of the ball races 43, the chains form a bearing between the rollers 49 and the tracks 41 so that the shackle travels smoothly over the tracks, with its weight supported by the tracks and hence the shackle applies a load to the weigh cell 14.

Since the rollers 49 only perform a rolling function when travelling up the fixed ramp members, it does not matter if the rollers become worn and tend to jam. While each shackle is travelling over the tracks 41, the rollers 49 do not perform any rolling function. All the rolling or bearing action is carried out by the ball races 43 and thus the shackle travels smoothly while its load is being applied to the weigh cell 14. If the tracks 41 were replaced by smooth plates over which the rollers 49 rolled, then any tendency for the rollers 49 to jam would cause a juddering or vibrating action on the plates and this would cause the weigh cell 14 to give an inaccurate or imprecise reading.

The spacing of the shackles is related to the length of the tracks 41 so that although only one shackle is supported by the chains 42 during the weighing by the transducer 14, which takes place while the shackle is passing over the central portion of the tracks, a second shackle comes into engagement with the chains before the preceding shackle leaves the chains. The chains are thus driven continuously by the sheckles.

The invention is not restricted to the details of the foregoing embodiments. For instance the smaller idler wheel 22 shown in FIG. 1 may be replaced by a fixed slide plate extending from adjacent the wheel 21 to a point adjacent to the support plate 18, as shown in dotted lines at 30 in FIG. 1. The items 19 may comprise endless chains instead of belts. Furthermore, each support plate 18 and endless belt may be replaced by a large diameter (e.g. 12") wheel on to which the shackles can ride. The axes of the wheels would be connected to the legs 15 and be driven at the appropriate speed. The axes of the wheels may be inclined to the horizontal so that the upper edges of the wheels are closer together than the lower edges.

I claim:
1. A conveyor system comprising:
   (a) a plurality of article carriers;
   (b) first conveyor means and a plurality of suspension means each securing one of said article carriers to said first conveyor means, said first conveyor means being arranged to convey said article carriers in succession in one direction along a predetermined path;

(c) electronic weight sensing means including a pair of spaced support members positioned at opposite sides, respectively, and adjacent to said path such that the succession of suspension means may pass therebetween with said article carriers therebelow;

(d) second conveyor means comprising a pair of spaced endless flexible members arranged for movement along opposite sides, respectively, of said path, the upper runs of said endless flexible members being adapted to move in the direction of movement of said article carriers and being inclined upwardly towards and passing over said pair of spaced support members of said weight sensing means;

(e) said first conveyor means being adapted to convey said suspension means with said article carriers between said pair of spaced endless flexible members and pair of spaced support members;

(f) each suspension means including means adapted to engage said upper runs of said endless flexible members as said suspension means moves along said path between said endless flexible members, whereby at least part of each suspension means and attached article carrier is elevated during passage between said endless flexible members by said inclined upper runs to a position where a load is applied to said pair of spaced support members, movement is imparted to said endless flexible members by said means adapted to engage the upper runs of said endless members such that said endless flexible members move at the same speed as said article carriers;

(g) said weight sensing means being arranged to emit a signal which is related to the total weight of said portion of each of said suspension means with attached article carrier and any article carried thereby.

2. A conveyor system as claimed in claim 1, in which each of said endless flexible members comprise an endless belt.

3. A conveyor system comprising:

(a) a plurality of article carriers;

(b) first conveyor means and a plurality of suspension means each securing one of said article carriers to said first conveyor means, said first conveyor means being arranged to convey said article carriers in succession in one direction along a predetermined path;

(c) electronic weight sensing means including a pair of spaced support members positioned at opposite sides, respectively, and adjacent to said path such that the succession of suspension means may pass therebetween with said article carriers therebelow;

(d) second conveyor means comprising a pair of spaced endless flexible members and means mounting each of said flexible members on one of said support members with an upper run of predetermined length which travels freely over said support member;

(e) a pair of spaced ramp means each having an upper surface inclined upwardly to the upstream end of said upper run of one of said endless flexible members;

(f) said first conveyor means being adapted to maintain said suspension means and article carriers at predetermined spaced intervals less than said predetermined length of said upper runs of said endless flexible members and to convey said suspension means with said article carriers between said pairs of spaced ramp means and spaced endless flexible members;

(g) each suspension means including means adapted to engage said upper surfaces of said ramp means and to drivingly engage said upper runs of said endless flexible members to impart movement thereto as said suspension means moves along said path between said ramp means and endless flexible members, whereby at least part of each suspension means and attached article carrier is elevated during passage between said pairs of ramp means by said inclined upper surfaces thereof and is then supported by said endless flexible means where a load is applied to said spaced support members, and each engaging means engages said endless flexible members before the preceding engaging means has disengaged whereby said endless flexible members are continuously driven;

(h) said weight sensing means being arranged to emit a signal which is related to the total weight of said portion of each of said suspension means with attached article carrier and any article carried thereby.

4. A conveyor system as claimed in claim 3, in which each of said endless flexible members comprises a chain comprising a plurality of rollers and links between said rollers, said links having recesses therein, each of said means adapted to engage said upper runs of said endless flexible members comprising projection means which engage said recesses to impart driving movement to said chains.

5. A conveyor system as claimed in claim 4, in which each chain comprises a plurality of ball races linked together, the ball races moving in tracks provided on the respective of said support members.

* * * * *